United States Patent
Zayas (10) Patent No.: US 7,325,103 B1
(45) Date of Patent: Jan. 29, 2008

(54) SERIALIZATION OF ADMINISTRATIVE OPERATIONS FOR ACCESSING VIRTUAL VOLUMES

(75) Inventor: Edward Ramon Zayas, Milpitas, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 233 days.

(21) Appl. No.: 11/110,450

(22) Filed: Apr. 19, 2005

(51) Int. Cl.
*G06F 13/14* (2006.01)
*G06F 12/14* (2006.01)

(52) U.S. Cl. .................. 711/150; 711/114; 711/151; 711/158; 711/163; 711/164; 711/168; 710/36; 710/40; 710/244

(58) Field of Classification Search ............... 711/163
See application file for complete search history.

(56) References Cited

U.S. PATENT DOCUMENTS 5,251,318 A * 10/1993 Nitta et al. ................. 711/152
2005/0015685 A1* 1/2005 Yamamoto .................. 714/54

* cited by examiner

*Primary Examiner*—B. James Peikari
(74) *Attorney, Agent, or Firm*—Blakely Sokoloff Taylor & Zafman LLP (57) ABSTRACT

A method of serializing administrative operations on virtual volumes includes operating a storage system to maintain a plurality of virtual volumes that share a pool of block storage, where each of the virtual volumes containing data stored on one or more physical storage devices. Administrative access to each of the virtual volumes is controlled individually by imposing serialization on administrative operations directed to each virtual volume.

23 Claims, 7 Drawing Sheets

SERIALIZATION OF ADMINISTRATIVE OPERATIONS FOR ACCESSING VIRTUAL VOLUMES

FIELD OF THE INVENTION

At least one embodiment of the present invention pertains to data storage systems, and more particularly, to serialization of administrative operations for accessing virtual volumes in a data storage system.

BACKGROUND

A storage server is a special-purpose processing system used to store and retrieve data on behalf of one or more client processing systems ("clients"). A storage server can be used for many different purposes, such as, to provide multiple users with access to shared data or to back up mission critical data.

A file server is an example of a storage server. A file server operates on behalf of one or more clients to store and manage shared files in a set of mass storage devices, such as magnetic or optical storage based disks or tapes. The mass storage devices may be organized into one or more volumes of Redundant Array of Inexpensive Disks (RAID). Another example of a storage server is a device which provides clients with block-level access to stored data, rather than file-level access, or a device which provides clients with both file-level access and block-level access.

In conventional file servers, data is stored in logical containers called "volumes" and "aggregates". An aggregate is a logical container for a pool of block storage, from which one or more RAID groups can be created. A volume is a set of stored data associated with a collection of mass storage devices, such as disks, which obtains its storage from an aggregate, and which is managed as a single administrative unit, i.e., as a single file system.

In conventional file servers there is a fixed, one-to-one relationship between a volume and an aggregate, i.e., each volume is exactly coextensive with one aggregate. Consequently, there is a fixed relationship between each volume and the disks that are associated with it. This fixed relationship means that each volume has exclusive control over the disks that are associated with the volume. Only the volume associated with the disk can read and/or write to the disk. Unused space within the disks associated with the volume cannot be used by another volume. Thus, even if a volume is only using a fraction of the space on its associated disks, the unused space is reserved for the exclusive use of the volume.

To overcome these limitations and other limitations of traditional volumes, a technology called FlexVol™ has been developed by Network Appliance, Inc. of Sunnyvale, Calif., and is available in Filers made by Network Appliance as a feature of the Data ONTAP™ storage operating system. FlexVol™ technology provides a kind of volume called a "flexible volume" or "virtual volume". A virtual volume is analogous to a traditional volume in that it is managed as a file system, but unlike a traditional volume, it is treated separately from the underlying physical storage that contains the associated data. A "virtual volume" is, therefore, a set of stored data associated with a collection of mass storage devices, such as disks, which obtains its storage from an aggregate, and which is managed as a single administrative unit, i.e., as a single file system, but which is flexibly associated with the underlying physical storage.

FlexVol™ technology allows the boundaries between aggregates and virtual volumes to be flexible, such that there does not have to be a one-to-one relationship between a virtual volume and an aggregate. An aggregate can contain multiple virtual volumes. Hence, virtual volumes can be very flexibly associated with the underlying physical storage block characteristics. Further, to help reduce the amount of wasted storage space, any free data block in an aggregate can be used by any virtual volume in the aggregate. A virtual volume can be grown or shrunk in size. Furthermore, blocks can be committed to virtual volumes on the fly from available storage.

While the advantages of FlexVol™ technology are apparent, it also creates certain challenges, particularly with regard to controlling administrative access to virtual volumes. A storage server on a network typically is managed by one or more network administrators, who may be responsible for configuring, provisioning and monitoring the storage server, scheduling backups, troubleshooting problems with the storage servers, performing software upgrades, etc. These administrative tasks can be accomplished from a management console. The management console is a separate computer system that runs a storage management software application and communicates with the storage server either directly or through a network.

There may be multiple network administrators who are authorized to perform administrative operations on a given volume, from various different administrative consoles. To avoid data inconsistencies and other errors from occurring, it is necessary to ensure that potentially conflicting administrative operations cannot be performed simultaneously on a given volume; i.e., it is necessary to serialize potentially conflicting administrative operations. Examples of administrative operations include: creating a volume, destroying a volume, placing a volume online, taking a volume off-line, renaming a volume, etc. For example, it is undesirable to allow one administrator to destroy a volume while the volume is being read by another administrator.

To address this issue, a feature known as RAID Lock has been employed to enforce serialization on administrative operations in file servers that use traditional volumes. RAID Lock is a simple spin lock implemented within the aggregate layer of a storage server's operating system. RAID Lock works well in a traditional system where there must be a one-to-one relationship between a volume and an aggregate. However, RAID Lock is not effective when used with virtual volumes, since there no longer must be a one-to-one relationship between aggregates and volumes.

More specifically, if RAID Lock were used with virtual volumes, then all administrative operations across all volumes in the same aggregate would have to be serialized. Consider an example where an administrator wishes to take offline a particular virtual volume in a particular aggregate. To do this, the administrator would have to take the aggregate's RAID Lock. For however long the aggregate's RAID Lock is held, any other administrative operation on any other virtual volume in that aggregate (and there could be hundreds) would be blocked. This result is highly undesirable from a performance standpoint, since all of these other operations on all of these other co-resident virtual volumes may be completely independent and otherwise semantically capable of being done in parallel.

SUMMARY OF THE INVENTION

The present invention includes a method and apparatus for serializing administrative operations on virtual volumes.

The method, according to an embodiment of the invention, includes operating a storage system to maintain a plurality of virtual volumes that share a pool of block storage, where each of the virtual volumes containing data stored on one or more physical storage devices. The method further includes controlling administrative access to each of the virtual volumes individually by imposing serialization on administrative operations directed to each virtual volume.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for imposing serialization on administrative operations directed to virtual volumes are described. As described in greater detail below, a storage system such as a file server maintains multiple virtual volumes that share a pool of block storage, i.e., an aggregate. A spin lock is implemented separately for each of the virtual volumes. The spin lock is stored in a data structure that contains a separate volume information entry for each of the virtual volumes. Each volume information entry contains metadata about the corresponding virtual volume and points to, either directly or indirectly, a volume locking entry for the corresponding virtual volume. Each volume locking entry contains a spin lock indicator to identify an administrative operation which currently has a lock on the corresponding virtual volume.

When the storage server receives a request to perform an administrative operation on a particular virtual volume (the "target" virtual volume), it first identifies the volume information entry which corresponds to the target virtual volume. The storage server then uses the identified entry to locate the lock indicator for the target virtual volume and determines whether to allow the administrative operation, based on the lock indicator of the target virtual volume and a defined access policy.

The approach being introduced here allows administrative operations on different virtual volumes that share the same aggregate to be done in parallel. In addition, this approach also allows certain operations to be done in parallel on the same virtual volume. Further, it will be seen that this approach yields increasing performance benefits as the number of volumes that can reside in an aggregate increases.

Figure 1:
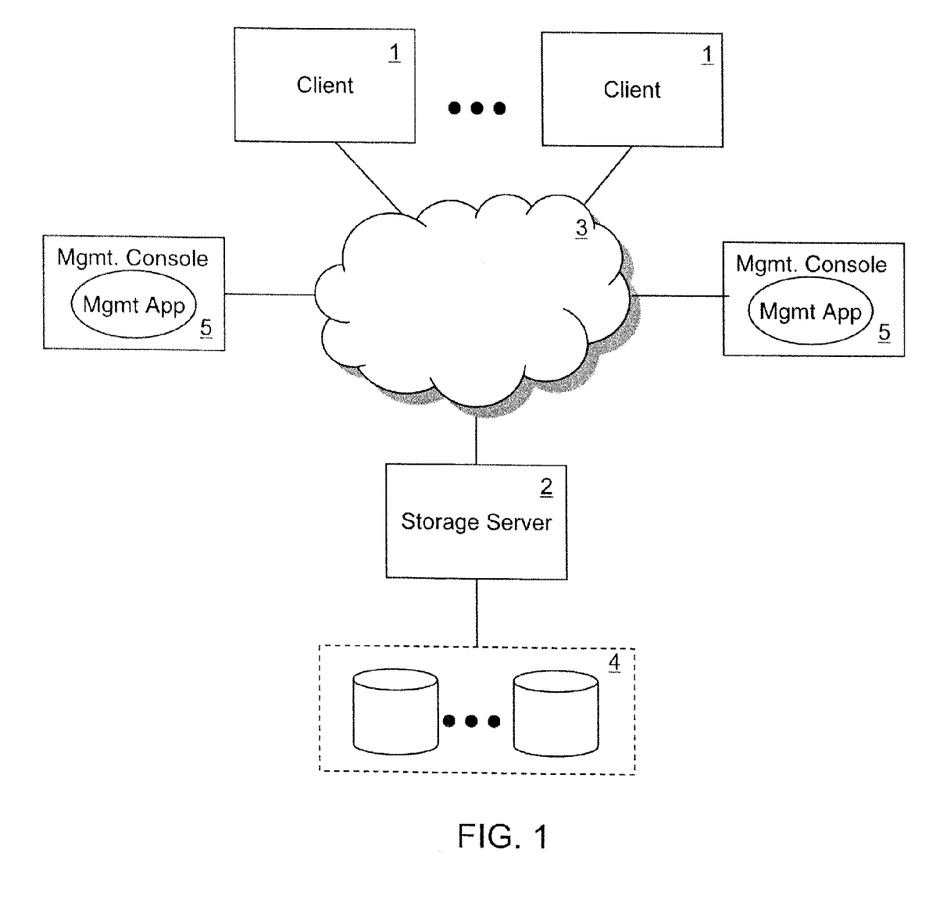
FIG. 1 illustrates an example of a network environment which includes a storage server, a set of clients, and a number of management consoles.

FIG. 1 shows a network environment in which the invention can be implemented. A storage server 2 is coupled locally to a storage subsystem 4, which includes multiple mass storage devices (e.g., disks). The storage server 2 is also coupled through a network 3 to a number of clients 1. The storage subsystem 4 is managed by the storage server 2. The storage server 2 receives and responds to various read and write requests from the clients 1, relating to files or other units of data stored in or to be stored in the storage subsystem 4.

Each of the clients 1 may be, for example, a conventional personal computer (PC), workstation, or the like. The storage server 2 may be, for example, a file server used in a network attached storage (NAS) mode (a "filer"), a block-based storage server such as used in a storage area network (SAN), or other type of storage server. The network 3 may be, for example, a local area network (LAN), a metropolitan area network (MAN), a wide area network (WAN), a global area network (GAN) such as the Internet, or other type of network or combination of networks. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in the storage subsystem 4 can be organized as one or more RAID groups, in which case the storage server 2 accesses the storage subsystem 4 using an appropriate RAID protocol.

Also connected to the network 3 are one or more management consoles 5, from which administrative operations on virtual volumes in the storage subsystem 4 can be sent to the storage server 2.

Figure 2:
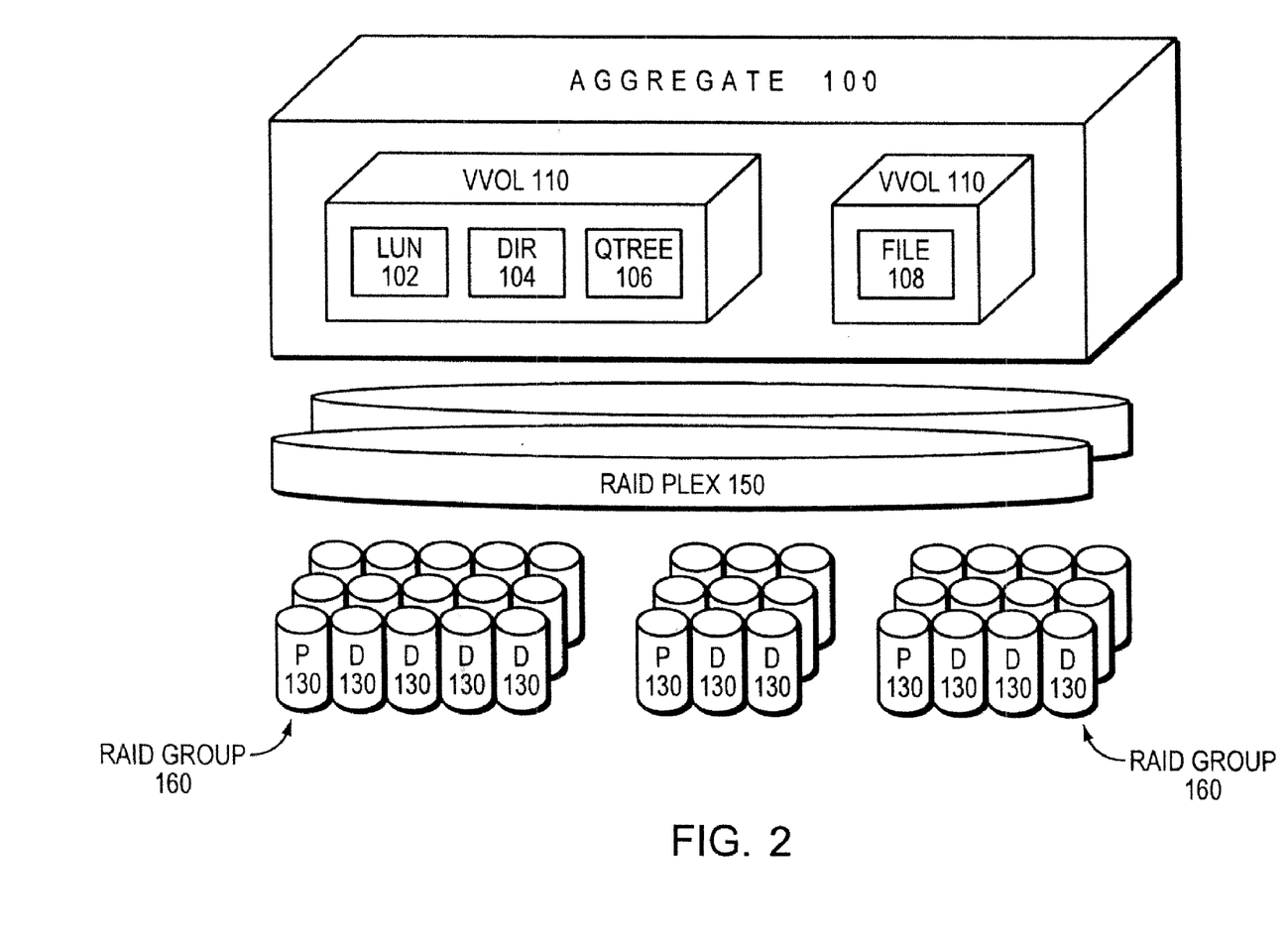
FIG. 2 illustrates an example of how the storage server can implement the relationships between virtual volumes and the underlying storage.

Refer now to FIG. 2, which illustrates an example of how the storage server 2 can implement the relationships between virtual volumes and the underlying storage. An aggregate 100 is the underlying physical storage for multiple virtual volumes ("vvol") 110. The aggregate 100 supports a "physical" file system, such as a write anywhere file system (e.g., the Write Anywhere File Layout (WAFL®) file system of Network Appliance, Inc., which is transparent to the users. Each virtual volume 110 can include named logical unit numbers (LUNs) 102, directories 104, quota trees ("qtrees") 106, and files 108. The aggregate 100 is illustratively layered on top of the RAID system, which is represented by at least one RAID plex 150 (depending upon whether the storage system is mirrored), where each plex 150 includes at least one RAID group 160. Each RAID group further comprises multiple disks 130, e.g., one or more data (D) disks and at least one (P) parity disk.

The aggregate 100 is analogous to a volume of a traditional storage system, and a virtual volume is analogous to a file within that aggregate. That is, the aggregate 100 may include one or more files, wherein each file contains a virtual volume 110 and wherein the sum of the storage space consumed by virtual volumes associated with the aggregate 100 is physically less than or equal to the size of the overall aggregate 100. The aggregate 100 utilizes a physical volume block number (PVBN) space that defines the storage space of blocks provided by the disks of the aggregate 100, while each virtual volume utilizes a "logical" or "virtual" volume block number (VVBN) space in order to organize those blocks as files. Each WBN space is an independent set of numbers that corresponds to locations within the file, which locations are then translated to disk block numbers (DBNs) on disks. Since the virtual volume 110 is also a logical volume, it has its own block allocation structures (e.g., active, space and summary maps) in its WBN space.

Each virtual volume 110 is a separate file system that is "mingled" onto a common set of storage in the aggregate 100 by the operating system of the storage server. The RAID system of the associated storage operating system builds a RAID topology structure for the aggregate 100 that guides each file system when performing write allocation. The RAID system also presents a PVBN-to-disk, DBN mapping to the file system.

According to certain embodiments of the invention, the storage server 2 can implement both traditional volumes and virtual volumes simultaneously. The storage server 2 maintains a separate hierarchical data structure for each virtual volume, traditional volume, and aggregate, to store metadata for those entities. The data structure contains all of the data needed by the storage server's operating system to manage and operate on the virtual volume, traditional volume or aggregate.

Figure 3:
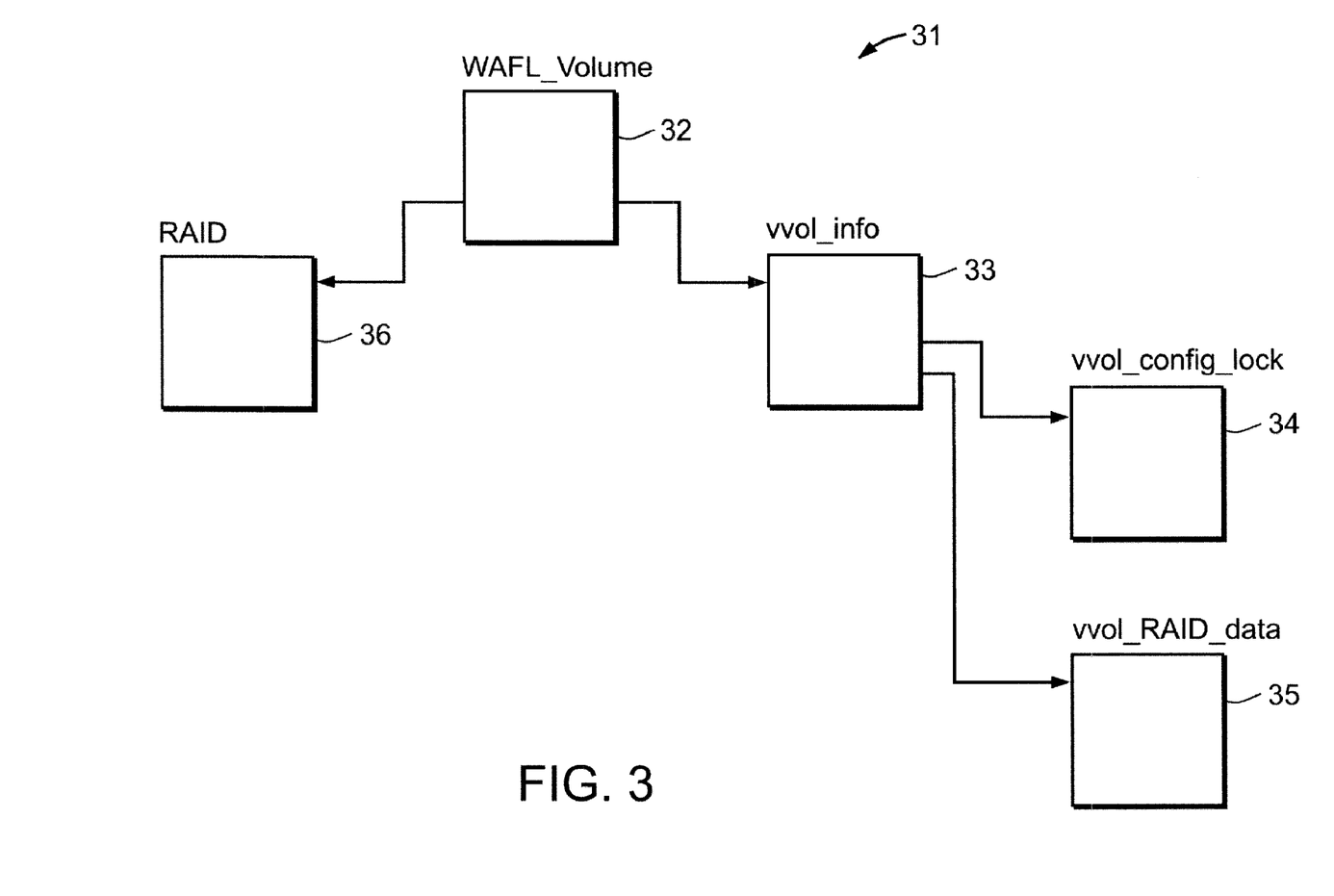
FIG. 3 illustrates an example of a data structure that can contain information about an aggregate, a virtual volume or a traditional volume.

An example of such a data structure is shown in FIG. 3 for a virtual volume. Each aggregate in the storage system maintains a queue of these data structures to track the virtual volumes that it hosts (if any). Each of these data storage structures is maintained in the queue for as long as the corresponding virtual volume exists, regardless of its mount state. Each virtual volume also maintains a pointer to its own data structure.

Referring to FIG. 3, the data structure 31 contains a set of linked data structures. The root of the overall data structure 31 is a data structure 32 called a WAFL_Volume structure. A WAFL_Volume structure 32 can describe any one of: an online traditional volume, an online virtual volume, or an online freestanding aggregate. As such, a WAFL_Volume structure 32 contains or points to all of the data (or metadata) needed to operate on or administer the traditional volume, virtual volume, or freestanding aggregate. Each WAFL_Volume structure 32 contains a type indicator (not shown) indicating which of these types of storage entities it represents, i.e., traditional volume, virtual volume, or freestanding aggregate.

When a WAFL_Volume structure 32 represents a freestanding aggregate, it contains information about the virtual volumes contained by the aggregate, by having a link to a queue of vvol_info data structures 33 (one vvol_info structure 33 for each virtual volume contained by the aggregate). The vvol_info structures 33 are described further below. The WAFL_Volume structure 32 for an aggregate or a traditional volume also contains a pointer to a corresponding RAID data structure 36, which contains the name of the aggregate and its file system identifier (FSID). The WAFL_Volume structure 32 for a virtual volume contains a null pointer to a RAID data structure 36.

When a WAFL_Volume structure 32 represents a virtual volume, it contains a pointer to one vvol_info data structure 33, rather than a queue of vvol_info data structures 33. A vvol_info data structure 33 contains or points to various metadata about the virtual volume to which it relates. The vvol_info data structure 33 is also used to store certain information about the virtual volume which must be persisted if the volume is taken off-line. If a virtual volume is taken off-line, its WAFL_Volume data structure 32 is deleted. However, the vvol_info data structure 33 can be used to retrieve the essential metadata of the volume if the volume is subsequently brought back online. The vvol_info data structure 33 contains the name of the virtual volume, a pointer back to the WAFL_Volume structure 32, a pointer to a data structure 34 called vvol_configlock, and a pointer to a data structure 35 called vvol_RAID_data. The vvol_RAID_data data structure 35 includes the name of this virtual volume and its FSID.

Figure 6:
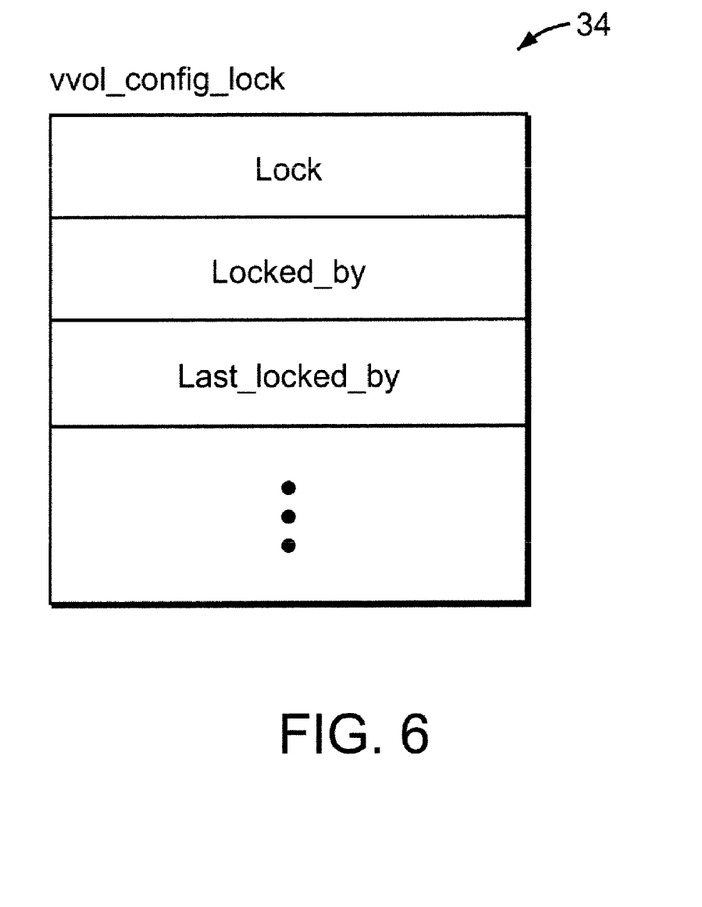
FIG. 6 shows an example of a vvol_config_lock data entry in the data structure of FIG. 3.

The vvol_configlock data structure 34 includes a spin lock indicator used to impose serialization on administrative operations directed to the virtual volume (i.e., to the virtual volume to which this vvol_configlock data structure relates). More specifically, as shown in FIG. 6, the vvol_configlock data structure 34 includes the fields, Lock and Locked_by, and optionally includes a third field, Last_locked_by. The Lock field represents a spin lock (a non-blocking lock) implemented by the storage operating system for this virtual volume and contains a single bit to indicate whether an operation currently owns the lock for this virtual volume. The Lock field is set when an operation is being performed on the virtual volume. The Locked_by field identifies the operation which currently owns the lock, if any. Other information can be stored in data structure 34, if desired.

Setting the lock is accomplished by providing to the storage server 2 a pointer to the vvol_info data structure 33 and a value to put into the Locked_by field. In response to receiving this, the storage operating system of the storage server 2 will set the lock if the lock is not already set.

The optional Last_locked_by field identifies the most recent value of the Locked_by field and can be used for debugging purposes. The value of Last_locked_by is the same as Locked_by when an operation owns the lock, but unlike Locked_by, it persists even after the lock is relinquished. In the event an error is detected, the value of Last_locked_by can be used to identify which operation was being performed when the error occurred in order to diagnose the error.

In addition, Last_locked_by can be used to allow certain non-conflicting operations to be performed on a virtual volume in parallel, thus overriding the lock in certain limited circumstances. Assume, for example, that a first administrative operation, such as a "Create Volume" command, currently has lock on a virtual volume when a second administrative operation, such as a status request, requests the lock. It may be desirable to allow the status command to be executed even while another operation such as "Create Volume" has lock on virtual volume, because it is known that the status command will not interfere with any other operation. The same may be true for other types of innocuous operations. Consequently, if a second operation requests the lock on virtual volume while the first operation still has lock, the operating system will change the value of Locked_by to indicate the second operation and will change the value of Last_locked_by to indicate the first operation. This allows certain non-conflicting operation is to be performed in parallel on virtual volume.

Figure 4:
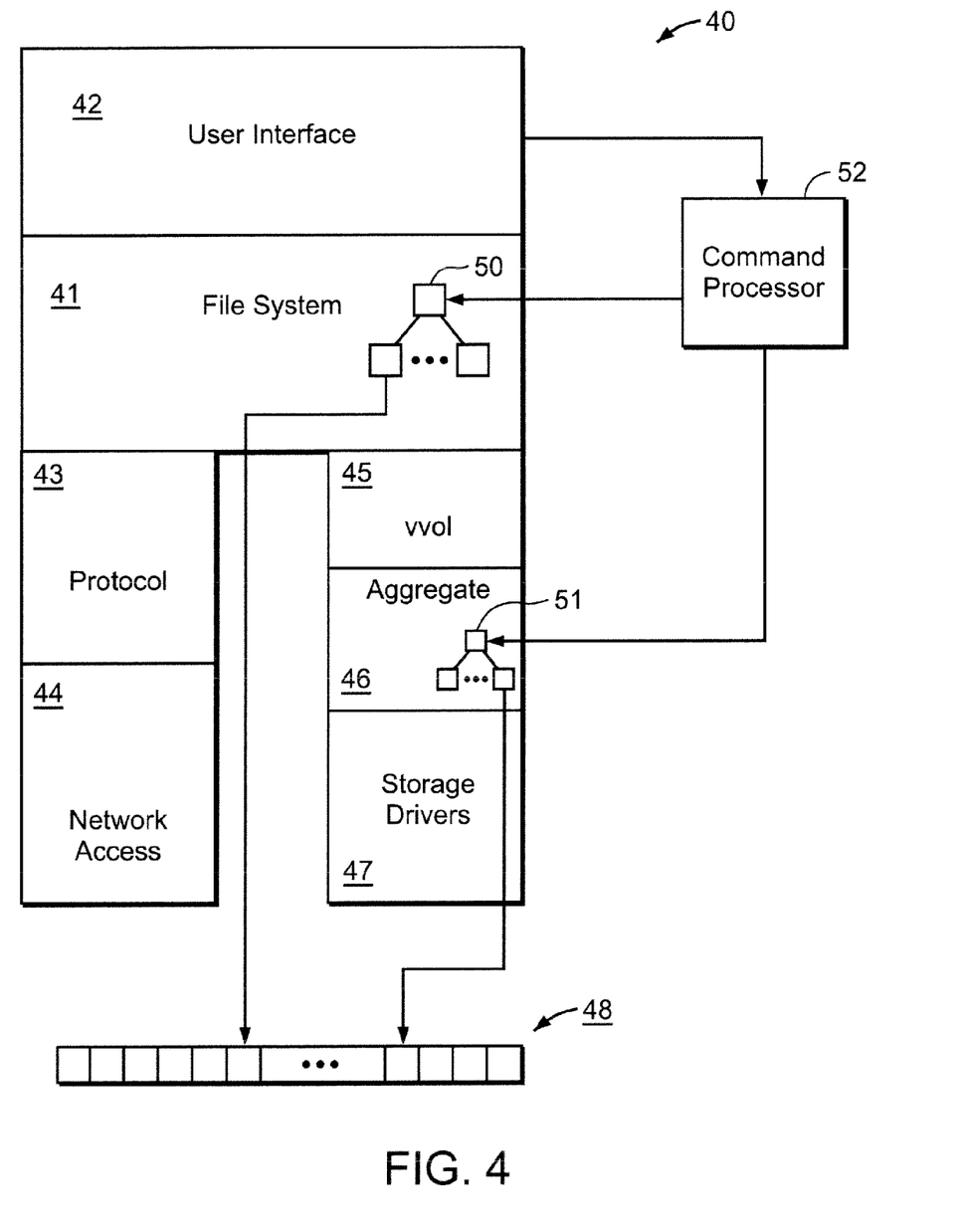
FIG. 4 shows an example of the operating system of the storage server.

FIG. 4 shows an example of the operating system 40 of the storage server 2, according to an embodiment of the invention. As shown, the operating system 40 includes several software modules, or "layers". These layers include a file system layer 41. The file system layer 41 is application-layer software which imposes a hierarchical structure on the data stored in the storage subsystem 4 and which services read/write requests from clients 1. Logically "on top of" the file system layer 41, the operating system 40 includes a user interface layer 42 which implements, for example, a command line interface (CLI), a graphical user interface (GUI), or both, through which administrative operations can be performed on the storage server 2. Logically "under" the file system layer 41, the operating system 40 also includes a protocol layer 43 and an associated network access layer 44, to allow the storage server 2 to communicate over the network 3 (e.g., with clients 1). The protocol 43 layer implements various higher-level network protocols, such as Network File System (NFS), Common Internet File System (CIFS), Hypertext Transfer Protocol (HTTP) and/or Transmission Control Protocol/Internet Protocol (TCP/IP), and serves to translate read/write requests from clients into a format understandable by the file system 41. The network access layer 44 includes one or more drivers to implement one or more lower-level protocols to communicate over the network, such as Ethernet, Fibre Channel and/or iSCSI.

Also logically under the file system layer 41, the operating system 40 includes a virtual volume ("vvol") layer 45, an aggregate layer 46 under the vvol layer 45, and an associated storage driver layer 47 under the aggregate layer 46, to allow the storage server 2 to communicate with the storage subsystem 4. The virtual volume layer 45 implements one or more virtual volumes using storage blocks obtained from the aggregate layer 46. The aggregate layer 46 implements a storage redundancy protocol, such as RAID, while the storage driver layer 47 implements a lower-level storage device access protocol, such as Fibre Channel Protocol (FCP) or small computer system interface (SCSI).

The operating system 40 also maintains a WAFL_Volume array 48, which is a queue containing all of the WAFL_Volume entries (such as WAFL_Volume structure 32 in FIG. 3) maintained by the storage server 2. As described above, each WAFL_Volume structure forms the root of a separate data structure for a volume or an aggregate. The WAFL_Volume array 48 may be stored in the main memory of the storage server 2 or in any other convenient storage location. To access the WAFL_Volume array 48, the file system layer 41 includes a virtual volume configuration (vv_config) thread 50, which can spawn a number of child threads. Similarly, the aggregate 46 layer has a RAID_config thread 51, which can spawn a number of child threads. The operating system 40 further includes a command processor 52, which processes external commands received via the user interface 42, such as commands to perform administrative operations.

Figure 7:
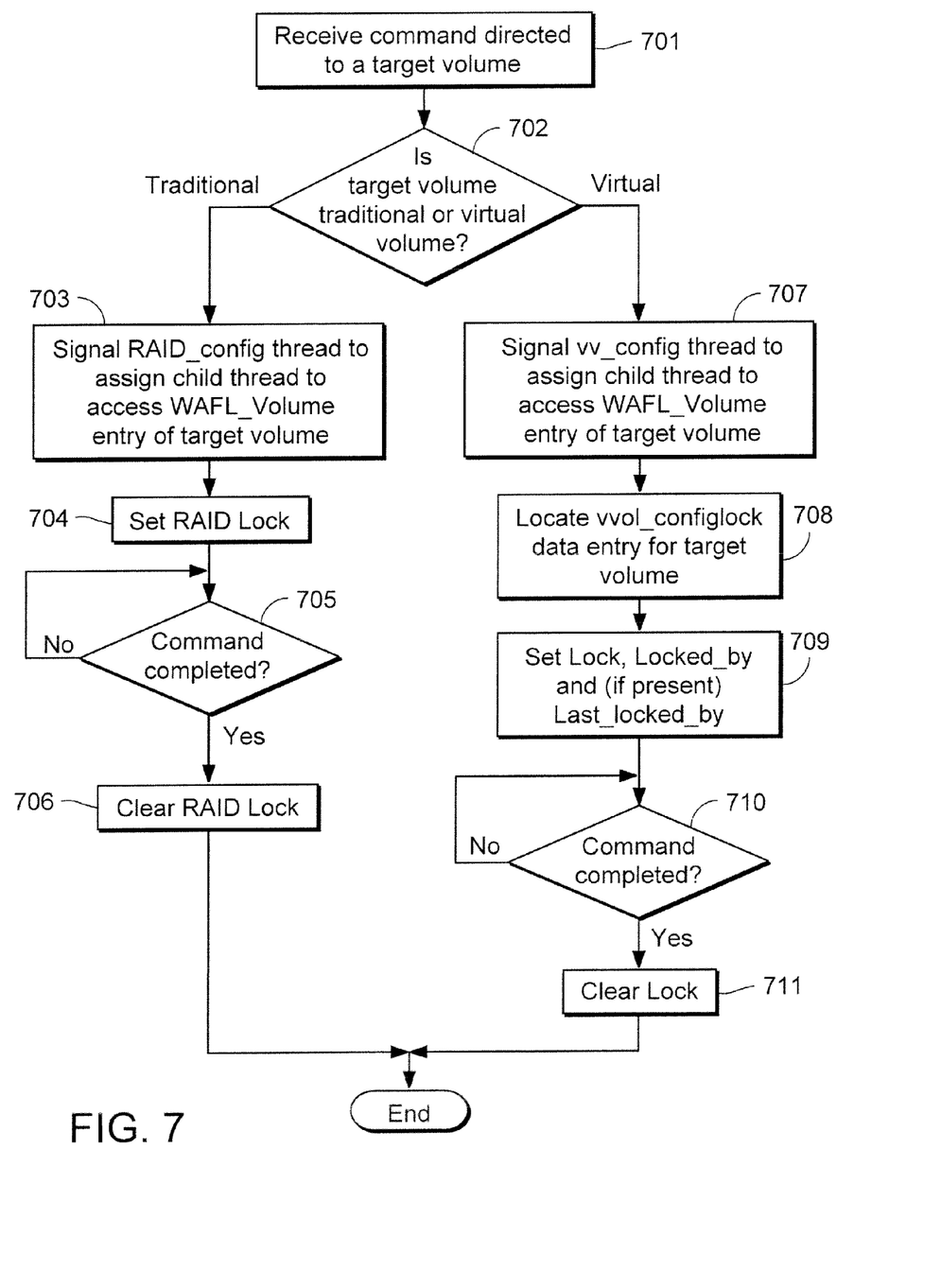
FIG. 7 is a flow diagram showing a process of enforcing serialization of commands.

The process of enforcing serialization of administrative operations, according to an embodiment of the invention, will now be further described with reference to FIGS. 4 and 7. In response to an incoming command (701) directed to a volume (the target volume), the command processor 52 first determines (702) whether the target volume is a traditional volume or a virtual volume. If the target volume is a traditional volume, the command processor 52 signals the RAID_config thread 51 to assign one of its child threads (703) to access the WAFL_Volume structure of the target volume in the WAFL_Volume array 48. Once the appropriate WAFL_Volume structure is accessed, the standard RAID Lock is used (704) to enforce serialization of commands. Unlike the Lock implemented in the vvol_configlock data structure 34, the RAID Lock affects (blocks out other operations on) all of the traditional volumes in the system when invoked, not just the target volume.

If the target volume is a virtual volume, the command processor 52 signals the vv_config thread 50 in the file system layer 41 to invoke one of its child threads (707) to access the WAFL_Volume structure of the target volume in the WAFL_Volume array 48. Once the appropriate WAFL_Volume structure is accessed, the structure is used to locate the vvol_configlock data structure (described above) for the target volume (708) and to set its spin lock field, Lock, the Locked_by field and (if present) the Last_locked_by field (708). This Lock, unlike the RAID Lock, blocks out other operations only for the target volume, and there can be exceptions for certain non-conflicting operation as discussed above. Once the command has been completed (705/710), the RAID Lock is cleared (706) if the target volume was a traditional volume, or the Lock in the vvol_configlock data structure is cleared (711) if the target volume was a virtual volume.

Figure 5:
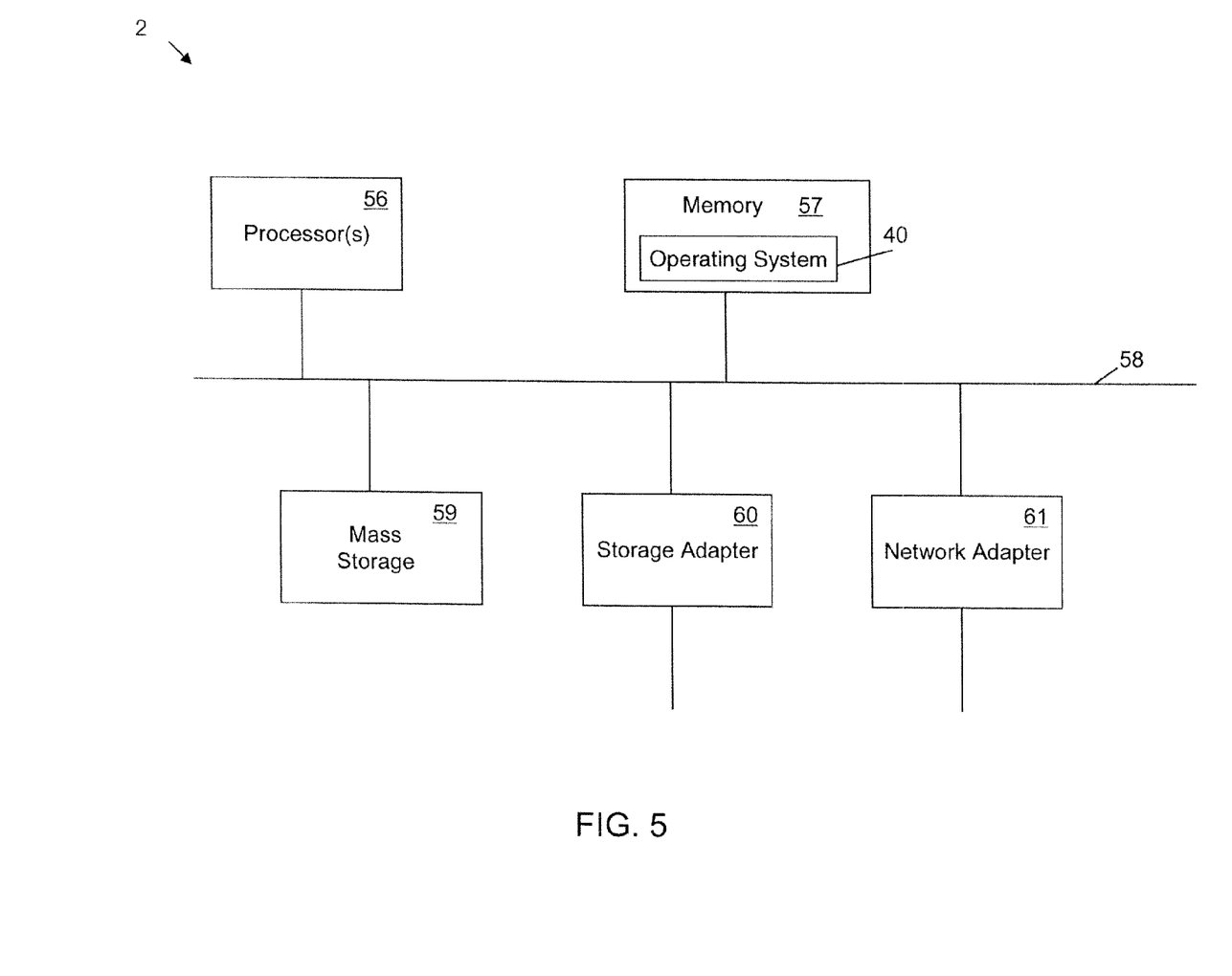
FIG. 5 is a high-level block diagram showing an example of the architecture of the storage server.

FIG. 5 is a block diagram showing an example of the architecture of the storage server 2 at a high level, according to an embodiment of the invention. Certain standard and well-known components which are not germane to the present invention are not shown. The storage server 2 includes one or more processors 56 and memory 57 coupled to a bus system 58. The bus system 58 shown in FIG. 5 is an abstraction that represents any one or more separate physical buses and/or point-to-point connections, connected by appropriate bridges, adapters and/or controllers. The bus system 58, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 56 are the central processing units (CPUs) of the storage server 2 and, thus, control its overall operation. In certain embodiments, the processors 56 accomplish this by executing software stored in memory 57. A processor 56 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 57 includes the main memory of the storage server 2 and is a form of machine-accessible medium. Memory 57 represents any form of random access memory (RAM), read-only memory (ROM), flash memory, or the like, or a combination of such devices. Memory 57 stores (among other things) the storage server's operating system 40, which can implement the technique introduced herein.

Also connected to the processors 56 through the bus system 58 are one or more internal mass storage devices 59, a storage adapter 60 and a network adapter 61. Internal mass storage devices 59 may be or include any conventional medium for storing large volumes of data in a non-volatile manner, such as one or more magnetic or optical based disks. The storage adapter 60 allows the storage server 2 to access the storage subsystem 4 and may be, for example, a Fibre Channel adapter or a SCSI adapter. The network adapter 61 provides the storage server 2 with the ability to communicate with remote devices, such as the clients 1, over a network and may be, for example, an Ethernet adapter, a Fibre Channel adapter, or the like.

Thus, a method and apparatus for imposing serialization on administrative operations directed to virtual volumes have been described.

A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

References throughout this specification to "one embodiment" or "an embodiment" mean that a particular feature, structure or characteristic described in connection with the embodiment is included in at least one embodiment of the present invention. Therefore, it is emphasized and should be appreciated that separate references in this specification to "an embodiment", "one embodiment" or "an alternative embodiment" are not necessarily all referring to the same embodiment. However, such references also are not necessarily mutually exclusive. Hence, the particular features, structures or characteristics being referred to may be combined as suitable in one or more embodiments of the invention, as will be recognized by those of ordinary skill in the art.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    operating a storage system to maintain a plurality of virtual volumes that share a pool of block storage, each of the virtual volumes containing data stored on one or more physical storage devices; and
    controlling administrative access to each of the virtual volumes individually by imposing serialization on administrative operations directed to each virtual volume.

2. A method as recited in claim 1, wherein controlling administrative access comprises implementing, independently for each of the virtual volumes, a first locking mechanism to impose serialization on administrative operations directed to the virtual volume.

3. A method as recited in claim 2, further comprising:
    operating the storage system to maintain a plurality of non-virtual volumes simultaneously with maintaining the plurality of virtual volumes; and
    imposing serialization on administrative operations directed to each of the non-virtual volumes by using a second locking mechanism different from the first locking mechanism, the second locking mechanism applying to all of the non-virtual volumes when invoked.

4. A method as recited in claim 3, wherein the second locking mechanism comprises a RAID Lock.

5. A method as recited in claim 3, wherein:
    the first locking mechanism is accessed by a file system layer of the storage system; and
    the second locking mechanism is accessed by a storage layer of the storage system.

6. A method as recited in claim 2, further comprising:
    selectively allowing the locking mechanism to be overridden by a specified type of administrative operation, such that two or more administrative operations including an administrative operation of the specified type can be performed in parallel on one of the virtual volumes.

7. A method as recited in claim 1, wherein the storage system further comprises an aggregate to provide a common pool of physical storage to the plurality of virtual volumes.

8. A method comprising:
    using a storage server to maintain a plurality of virtual volumes containing data stored on a plurality of physical storage devices, each of the virtual volumes being defined to correspond to one or more of the physical storage devices according to a flexible relationship;
    using the storage server to maintain a data structure that contains a separate volume information structure for each of the virtual volumes, each said volume information structure containing metadata about the corresponding virtual volume, each said volume information structure pointing to, either directly or indirectly, a volume locking entry for the corresponding virtual volume, each said volume locking entry containing a lock indicator to identify an administrative operation which has a lock on the corresponding virtual volume;
    receiving a request at the storage server to perform an administrative operation on a target volume of the plurality of virtual volumes;
    in response to the request, identifying an entry in the data structure which corresponds to the target volume;
    using the identified entry to locate the lock indicator for the target virtual volume; and
    determining whether to allow the administrative operation based on the lock indicator of the target virtual volume and a defined access policy.

9. A method as recited in claim 8, wherein the storage system further maintains an aggregate to provide a common pool of physical storage to the plurality of virtual volumes.

10. A method as recited in claim 8, further comprising:
    selectively allowing a lock on a virtual volume to be overridden by a specified type of administrative operation, such that two or more administrative operations including an administrative operation of the specified type can be performed in parallel on one of the virtual volumes.

11. A method as recited in claim 8, further comprising:
    using the storage server to maintain a plurality of non-virtual volumes simultaneously with maintaining the plurality of virtual volumes; and
    imposing serialization on administrative operations directed to each of the non-virtual volumes by using a RAID Lock.

12. A method as recited in claim 11, wherein:
    the lock indicator for each of the virtual volumes is accessed by a file system layer of the storage server; and
    the RAID Lock for each of the non-virtual volumes is accessed by a storage layer of the storage server.

13. A storage server comprising:
    a storage interface through which to communicate with an array of mass storage devices;
    a communications interface through which to receive from a client a request to access data stored in one or more of the mass storage devices; and
    a processor, coupled to the communications interface and the storage interface, to maintain a plurality of virtual volumes containing data stored in the plurality of mass storage devices, each of the virtual volumes being defined to correspond to one or more of the mass storage devices according to a flexible relationship, the processor further to maintain the data stored in the array of mass storage devices in a file system, and to control administrative access to each of the virtual volumes independently by implementing, independently for each of the virtual volumes, a first locking mechanism to impose serialization on administrative operations directed to the virtual volume.

14. A storage server as recited in claim 13, wherein the storage system further comprises an aggregate to provide a common pool of physical storage to the plurality of virtual volumes.

15. A storage server as recited in claim 13, wherein the processor is further to selectively allow the locking mechanism to be overridden by a specified type of administrative operation, such that two or more administrative operations including an administrative operation of the specified type can be performed in parallel on one of the virtual volumes.

16. A storage server as recited in claim 13, wherein the processor is further to:
   maintain a plurality of non-virtual volumes simultaneously with maintaining the plurality of virtual volumes; and
   impose serialization on administrative operations directed to each of the non-virtual volumes by using a second locking mechanism different from the first locking mechanism, the second locking mechanism applying to all of the non-virtual volumes when invoked.

17. A storage server as recited in claim 16, wherein the second locking mechanism comprises a RAID Lock.

18. A storage server as recited in claim 17, further comprising:
   a file system layer; and
   a storage layer;
   wherein the first locking mechanism is accessed by the file system layer, and the RAID Lock is accessed by the storage layer.

19. A storage system comprising:
   means for maintaining a plurality of virtual volumes sharing a pool of block storage, each of the virtual volumes containing data stored on a plurality of physical storage devices, each of the virtual volumes being defined to correspond to one or more of the physical storage devices according to a flexible relationship; and
   means for using a locking mechanism to impose serialization on administrative operations directed to each of the virtual volumes, independently for each of the virtual volumes.

20. A storage server as recited in claim 19, further comprising an aggregate to provide a common pool of physical storage to the plurality of virtual volumes.

21. A storage server as recited in claim 19, further comprising:
   means for selectively allowing the locking mechanism to be overridden by a specified type of administrative operation, such that two or more administrative operations including an administrative operation of the specified type can be performed in parallel on one of the virtual volumes.

22. A storage server as recited in claim 19, further comprising:
   means for maintaining a plurality of non-virtual volumes simultaneously with maintaining the plurality of virtual volumes; and
   means for imposing serialization on administrative operations directed to each of the non-virtual volumes by using a RAID Lock.

23. A storage server as recited in claim 22, wherein:
   the locking mechanism for each of the virtual volumes is accessed by a file system layer of the storage server; and
   the RAID Lock for each of the non-virtual volumes is accessed by a storage layer of the storage server.

* * * * *